United States Patent Office 3,320,222
Patented May 16, 1967

3,320,222
COPOLYMERS OF ETHYLENE AND 2-HYDROXY-METHYL-5-NORBORNENE
Saul M. Cohen, Springfield, Mass., assignor, by mesne assignments, to Monsanto Company, a corporation of Delaware
No Drawing. Filed Oct. 28, 1963, Ser. No. 319,526
3 Claims. (Cl. 260—88.1)

This invention relates to copolymers of ethylene and 2-hydroxymethyl-5-norborene. These crosslinkable film-forming materials have been found to possess versatile adhesive properties and can be used in chemically resistant surface coatings, electrical insulation and paper treatment.

2-hydroxymethyl-5-norbornene or bicyclo[2,2,1]-hept-5-ene-2-methylol is readily prepared by condensing allyl alcohol with cyclopentadiene as shown in U.S. Patents 2,596,279 and 2,352,606. It is an interesting bifunctional molecule having a rather bulky, rigid structure which has been polymerized with various ethylenically unsaturated monomers, including in particular acrylic compounds such as the alkyl esters of the lower acrylic acids, the acids themselves, their nitriles and amides, and polymerizable esters such as the vinyl esters and those of unsaturated dibasic acids. In general, it has been noted that the copolymerization of 2-hydroxymethyl-5-norbornene is most effective, in terms of norbornene content attained in the copolymers with the materials just enumerated, when it is carried out in the presence of acrylate and methacrylate esters. Homopolymers of 2-hydroxymethyl-5-norbornene are not known; they apparently cannot be made by techniques known to date. Neither, for that matter, have copolymers of ethylene with 2-hydroxymethyl-5-norbornene been prepared.

It is thus an object of this invention to provide copolymers of ethylene and 2-hydroxymethyl-5-norbornene. Another object is to prepare versatile adhesive materials which will serve to bind difficult-to-glue materials. Still another object is to provide adherent film-forming copolymers of ethylene which can be crosslinked to chemically resistant surface coatings.

These and other objects have been accomplished by subjecting 2-hydroxymethyl-5-norbornene to the action of an addition polymerization catalyst such as $\alpha,\alpha'$-azo-diisobutyronitrile, in the presence of ethylene at a pressure of approximately 5000 p.s.i.g. and at a temperature of about 50 to 70° C.

There are thus obtained copolymers in which the molecular weight as well as the number of units provided by each monomer vary with the time of reaction, the concentration of the monomers, the temperature and the pressure employed. In general, the data suggests that the more 2-hydroxymethyl-5-norbornene is present in the reaction mixture, the lower will be the conversion and molecular weight.

The following examples will serve to illustrate but not to limit the invention. All parts and percentages given therein are on a weight basis unless otherwise noted.

Example 1

The following materials were charged into an autoclave:

| Ingredients: | Parts |
|---|---|
| 2-hydroxymethyl-5-norbornene | 100 |
| Water | 100 |
| Sodium bicarbonate | 1.0 |
| Polyvinyl alcohol ("Gelvatol" 20/30) | 2.5 |
| Tween 40 | 1.4 |
| Tergitol NP-35 | 1.4 |
| $\alpha,\alpha'$-Azo-diisobutyronitrile | 2.4 |

(The polyvinyl alcohol used, "Gelvatol" 20/30, is a commercially available product containing approximately 20% by weight of residual polyvinyl acetate and having a 4% aqueous solution viscosity of about 5 centipoises at 20° C. Tween 40 and Tergitol NP-35 are non-ionic surface active agents, the former being a polyoxyethylene sorbitan monopalmitate and the latter, a nonylphenol polyethylene glycol ether.) The autoclave was flushed with nitrogen and pressurized at 2600 p.s.i.g. with ethylene. The temperature was raised gradually to about 75° C. and the reaction controlled by cooling the vessel with water when necessary. The polymerization occurred principally between 50 and 70° C. at 5000 to 5600 p.s.i.g. during about 12 hours. Approximately 2000 p.s.i.g. of ethylene was consumed at 70° C The reaction product was flushed from the autoclave with cold water, filtered and washed with cold water until foaming ceased. The collected solids were then washed in two 500 ml. portions of cold methanol followed by 500 ml. of warm methanol (45° C.) and filtered after each wash. The material was then dried for 7 hours at 50° C. under a pressure of 25 mm. Hg.

There was thus obtained 35.7 parts of cream colored, amorphous free-floping powder which melted at 115° C. and gave evidence of crosslinking at 218° C. On attempts to ignite, the material was found to be non-burning; it melted and volatilized, leaving no residue. Chemical analysis showed that the material consisted of 20.4 weight percent of the norbornene and 79.6 weight percent of ethylene which corresponds to an ethylene to 2-hydroxymethyl-5-norbornene mole ratio of 17.3:1.

The copolymer was soluble in benzene, ethylene chloride, pyridine and dioxane; it did not dissolve in water, methyl alcohol, acetone, methyl acetate, acetic acid, hexane and dimethylacetamide, but swelled in dimethylsulfoxide.

A film of the copolymer cured with stoichiometric amounts of tolylene diisocyanate had the following improved tensile properties:

Yield strength, $2230 \pm 153$ p.s.i.; break strength, $2390 \pm 147$ p.s.i.; elongation, $25.5\% \pm 17.5$.

The product showed good adhesion to a variety of materials including polyethylene terephthalate, cellulose acetate, nylon, polyethylene, poly(vinyl fluoride), tin and copper.

The adhesion was greatly improved however with the use of a crosslinking agent. For example, copolymer treated with stoichiometric amounts of tolylene diisocyanate, i.e. 0.14 g. per gram of resin, pressed with a substrate at 245° F. for 10 minutes under a platen prespressure of 3000 p.s.i.g. produced the following results when cooled and peeled: excellent adhesion was noted to such materials as cellulose acetate, polyethylene terephthalate (Mylar), poly(vinyl fluoride), tin, copper, aluminum and nylon; adhesion to steel was almost nearly as good. In the case of Mylar, it was also noted that the adhesion remained excellent even after 30 days. The substitution of pyromellitic dianhydride for tolylene diisocyanate as a curing agent resulted in similar adhesion to the above mentioned materials, with the exception of tin and nylon for which ratings of fair and poor were obtained.

Example 2

Another polymerization was conducted with the ingredients, technique and equipment of Example 1, except that there was charged originally into the autoclave 20 parts of 2-hydroxymethyl-5-norbornene instead of 100 parts and 130 parts of water of each of these ingredients respectively.

There was obtained in this manner 85.8 parts of a white solid material which melted at 130° C. and crosslinked at 230° C. It was soluble in benzene and high flash naphtha. It was not soluble in pyridine and ethylene chloride. Through determination of hydroxyl groups, it was found that the copolymer contained 94.6 weight percent of ethylene units, the balance consisting of norbornene units; this corresponds to an ethylene to 2-hydroxymethyl-5-norbornene mole ratio of 77.9:1. The properties of this particular copolymer were found not to differ greatly from those of polyethylene. In the case of adhesion, no improvement was achieved by the use of tolylene diisocyanate.

The copolymer of this invention contains preferably from 10 to 25% by weight of units derived from 2-hydroxymethyl-5-norbornene and from 75 to 90% by weight of ethylene units.

It may be prepared in bulk, solution or aqueous dispersion. The last method is favored however as it permits obtention of a controlled particle size through the use of stabilizing agents such as for example polyvinyl alcohol, the cellulose ethers, some nautral gums, and so on. The selection of surface active agents is not critical inasmuch as stable aqueous emulsions of the products are not desired. Should this be required, it could be achieved readily, it is believed, by empirical selection of one or more surfactants from the great number of commercial prdoucts of that class that is available. The catalyst employed can be any one of the free radical polymerization initiator class which is able to maintain a reasonable reaction rate at the temperature range which has been found most effective for the monomer system, i.e. about 50 to 70° C. This, in practice, includes the organic and inorganic peroxides as well as the nitrogenous materials of the type used in the examples.

An interesting aspect of the copolymers of this invention is their behavior with crosslinking agents. These agents are, naturally, those polyfunctional materials capable of reacting with the free hydroxyl groups of the copolymers. The class includes polyisocyanates and polycarboxylic compounds, for example the favored tolylene diisocyanate and other compounds such as pyromellitic dianhydride, maleic anhydride, benzophenonetetracarboxylic acid dianhydride, 85% phosphoric acid and the like. What is interesting and surprising in the present situation is that quantities of crosslinking agents smaller than stoichiometric ones will not improve the adhesion of the copolymers of thie preferred class to the materials enumerated in the examples. Such amounts will often in fact cause a decrease in adhesion rather than improve that important property.

What is claimed then is:

1. A copolymer of 2-hydroxymethyl-5-norbornene and ethylene in which the weight content of 2-hydroxymethyl-5-norbornene units is within the range of about 10 to 25% by weight.

2. A curable composition consisting of the polymer of claim 1 with at least a stoichiometric quantity of a hydroxyl group reactive polyfunctional curing agent.

3. The curable composition of claim 2 wherein a stoichiometric quantity of tolylene diisocyanate is used as the curing agent.

References Cited by the Examiner

UNITED STATES PATENTS

| | | | |
|---|---|---|---|
| 2,838,479 | 5/1958 | Biletch | 260—86.1 |
| 2,985,611 | 5/1961 | Gaylord | 260—851 |
| 3,076,793 | 2/1963 | Henrich | 260—80.5 |
| 3,083,171 | 3/1963 | Aronoff | 260—29.4 |

JOSEPH L. SCHOFER, *Primary Examiner.*

M. B. KURTZMAN, *Assistant Examiner.*

Notice of Adverse Decision in Interference

In Interference No. 96,298 involving Patent No. 3,320,222, S. M. Cohen, COPOLYMERS OF ETHYLENE AND 2-HYDROXY-METHYL-5-NOR-BORNENE, final judgment adverse to the patentee was rendered Aug. 7, 1968, as to claim 1.

[*Official Gazette October 29, 1968.*]